(12) United States Patent
Shimazu et al.

(10) Patent No.: US 9,528,312 B2
(45) Date of Patent: Dec. 27, 2016

(54) ACTIVE OBJECT DETECTION SENSOR

(71) Applicant: OPTEX CO., LTD., Shiga (JP)

(72) Inventors: Masayuki Shimazu, Otsu (JP);
Takayasu Ikeda, Otsu (JP); Kenta Shimoji, Otsu (JP); Takuya Maeda, Otsu (JP)

(73) Assignee: OPTEX CO., LTD., Shiga (JP)

( * ) Notice: Subject to any disclaimer, the term of this patent is extended or adjusted under 35 U.S.C. 154(b) by 86 days.

(21) Appl. No.: 14/699,311

(22) Filed: Apr. 29, 2015

(65) Prior Publication Data

US 2015/0322707 A1    Nov. 12, 2015

(30) Foreign Application Priority Data

May 8, 2014    (JP) ................................ 2014-096699

(51) Int. Cl.
*G01S 17/02* (2006.01)
*E05F 15/73* (2015.01)
*G01S 7/497* (2006.01)
*G01V 8/12* (2006.01)
*G06F 3/03* (2006.01)
(Continued)

(52) U.S. Cl.
CPC ............ *E05F 15/73* (2015.01); *G01S 7/4813* (2013.01); *G01S 7/4972* (2013.01); *G01S 7/51* (2013.01); *G01S 17/026* (2013.01); *G01V 8/12* (2013.01); *G06F 3/0304* (2013.01); *E05F 2015/765* (2015.01)

(58) Field of Classification Search
CPC ... E05F 15/73; E05F 2015/765; G01S 17/026; G01S 7/4972; G01S 7/4813; G01S 7/51; G01S 3/0304

USPC .................................................. 250/214.1
See application file for complete search history.

(56) References Cited

U.S. PATENT DOCUMENTS 5,015,840 A *   5/1991   Blau .................... F16P 3/14
                                              250/208.3
5,596,310 A     1/1997   Itoh
(Continued)

FOREIGN PATENT DOCUMENTS

DE    10 2011 102 963 A1    12/2012
JP       H06-68366 A          3/1994
(Continued)

OTHER PUBLICATIONS

The extended European search report issued by the European Patent Office on Sep. 15, 2015, which corresponds to European Patent Application No. 15165725.1-1559 and is related to U.S. Appl. No. 14/699,311.

*Primary Examiner* — Seung C Sohn
(74) *Attorney, Agent, or Firm* — Studebaker & Brackett PC

(57) ABSTRACT

An active object detection sensor is provided which allows an installation worker to easily adjust a detection area, and further identify an optimum position of a guide mark in a touch detection area. The active object detection sensor used for opening/closing of automatic an opening/closing unit (3) includes: an object determination unit (52) that during an operation mode determines that an object is in a detection area (A) when a detection level of a detection beam received by a receiver (22) exceeds an operation threshold to output an object detection signal; and a detection level indication unit (43) that during an adjustment mode indicates the detection level of the detection beam received by the receiver (22).

12 Claims, 7 Drawing Sheets

(51) Int. Cl.
*G01S 7/481* (2006.01)
*G01S 7/51* (2006.01)

(56) References Cited

U.S. PATENT DOCUMENTS

| | | | | |
|---|---|---|---|---|
| 5,812,058 A * | 9/1998 | Sugimoto | ............ | G08B 13/183 340/501 |
| 7,164,119 B2 * | 1/2007 | Iwasawa | ................. | G01V 8/12 250/205 |
| 7,271,722 B2 * | 9/2007 | Iwasawa | ................. | G01V 8/20 340/540 |
| 2012/0126100 A1 | 5/2012 | Fukumura et al. | | |

FOREIGN PATENT DOCUMENTS

| | | |
|---|---|---|
| JP | 2009-115792 A | 5/2009 |
| JP | 2009-122044 A | 6/2009 |
| JP | 5150810 B2 | 2/2013 |

* cited by examiner (a)

(b)

(c)

(a)

(b)

ACTIVE OBJECT DETECTION SENSOR

CROSS REFERENCE TO THE RELATED APPLICATION

This application is based on and claims Convention priority to Japanese patent application No. 2014-096699, filed May 8, 2014, the entire disclosure of which is herein incorporated by reference as a part of this application.

BACKGROUND OF THE INVENTION

1. Field of the Invention

The present invention relates to an active object detection sensor that projects a detection beam and that detects an object based on a reception signal that depends on the beam reflected by the object.

2. Description of Related Art

To date, an active object detection sensor has been known which projects a detection beam such as an infrared beam from a projector onto a detection area, causes a receiver to receive the beam reflected by the object to generate a reception signal, and detects the object such as a human body when the reception signal has a level that exceeds a setting level.

On the other hand, in an automatic door having a touch switch, the door opens only by the touch switch being touched. Instead of such a touch switch being provided, a guide mark that indicates, for example, "Please touch with hand" is attached to a door in some cases (Japanese Patent No. 5150810). When a person who would like to open the door, moves his/her hand close to the guide mark, an active object detection sensor that forms a touch detection area immediately surrounding the guide mark, detects the hand in the touch detection area.

The touch detection area is adjusted by an installation worker after the automatic door, and an automatic door sensor device that includes the active object detection sensor which forms a detection area, are installed. For example, while the installation worker is moving an object, such as a reflector plate in positions estimated as a boundary of the touch detection area, the installation worker monitors a reaction of the active object detection sensor, that is, a result as to whether or not the beam reflected by the reflector plate are detected. Thus, the installation worker is allowed to recognize the boundary of the invisible touch detection area. Then, the installation worker who recognizes the boundary of the touch detection area, adjusts an orientation of the active object detection sensor such that the touch detection area is adjusted so as to be in a position proper for the automatic door, that is, in a position immediately surrounding the guide mark.

In this adjustment, the active object detection sensor outputs a result representing "detected" when the reflector plate is positioned in the touch detection area, whereas the active object detection sensor outputs a result representing "not detected" when the reflector plate is positioned outside the touch detection area. That is, the adjustment of the touch detection area is performed based on two values representing "detected" and "not detected", whereby a circumferential boundary of the touch detection area is approximately identified.

On the other hand, a device is known which allows an operator to recognize an amount of the beam received by an infrared sensor in an optical axis adjustment between a light projecting unit and a light receiving unit in an intruder detection device (JP Laid-open Patent Publication No. H06-68366). This device allows the operator to easily recognize an amount of light received by the infrared sensor, by, for example, an LED being caused to blink at a frequency corresponding to the amount of light received by the infrared sensor. Thus, the operator may adjust an optical axis such that an amount of light received by the infrared sensor becomes maximum.

DISCLOSURE OF THE INVENTION

However, none of the aforementioned active object detection sensors cause the LED to blink at a frequency corresponding to an amount of light received by the infrared sensor. This is because, even if detection levels are obtained with respect to various orientations of the aforementioned active object detection sensor, the orientation of the sensor where a detection level is highest cannot be determined to be proper for the guide mark.

The inventors of the present invention have noted that, in the active object detection sensor, through indication of detection levels of the beam reflected by an object in the touch detection area, the touch detection area can be optimally adjusted with respect to the guide mark if the touch detection area is adjusted in a certain way. The inventors of the present invention have also noted that, through indication of detection levels of the detection beam reflected by an object in a general detection area (object detection area) in which an object is to be detected, as well as in the touch detection area, the detection area can be easily adjusted.

Therefore, an object of the present invention is to provide an active object detection sensor that allows the installation worker to easily adjust a detection area through indication of detection levels of a beam reflected by an object in the detection area, and to further identify an optimum position of a guide mark in a touch detection area.

In order to attain the aforementioned object, an active object detection sensor, according to one aspect of the present invention, used for opening/closing of an automatic opening/closing unit, includes:

a projector configured to project a detection beam onto a detection area;

a receiver configured to receive the detection beam reflected by an object in the detection area;

an object determination unit configured to, while an action mode is an operation mode, determine that an object is in the detection area when a detection level of the detection beam received by the receiver exceeds an operation threshold, to output an object detection signal; and a detection level indication unit configured to, while the action mode is an adjustment mode, indicate the detection level of the detection beam received by the receiver.

In this configuration, while the action mode is the adjustment mode, indication of the detection level of the detection beam reflected by an object in the detection area is provided. Therefore, by observing the indication of the detection level while an object is being moved about the detection area, a distribution of the detection levels in the detection area can be obtained. Thus, by moving an object such as the installation worker's hand about the detection area, the detection area can be easily adjusted.

According to a preferred embodiment, an action mode setting unit configured to enable the action mode to be set to one of the adjustment mode and the operation mode, is further provided.

According to a preferred embodiment, the detection area includes a touch detection area, and the projector projects a detection beam onto the touch detection area so as to detect an object that contacts with a predetermined portion of the automatic opening/closing unit, or an object that will contact with the predetermined portion thereof.

In the description herein, the "object that will contact with a predetermined portion of the automatic opening/closing unit" refers to an object that acts so as to touch the guide mark in order to open the automatic opening/closing unit in a non-contact switch type an automatic opening/closing unit. The "touch detection area" may be defined so that in the area an object that acts so as to touch the guide mark in order to open the automatic opening/closing unit in the non-contact switch type automatic opening/closing unit, is detected, but the object that is not acting so as to contact with the guide mark is less likely to be detected. The "non-contact switch type automatic opening/closing unit" refers to an automatic opening/closing unit that looks, to an operator of the automatic opening/closing unit, like a so-called touch switch-type automatic opening/closing unit which opens in response to an object touching a mark or the like, but actually detects an object near a predetermined portion to which the guide mark is attached, and opens.

In this configuration, since a distribution of the detection levels in the touch detection area can be recognized, an optimum position where the guide mark should be attached can be identified. Therefore, an operator who is typically the installation worker, moves an object such as the operator's hand about the touch detection area, whereby an optimum position of the guide mark in the touch detection area can be identified.

Preferably, to the predetermined portion of the automatic opening/closing unit, a guide mark is attached.

According to a preferred embodiment, an information providing unit configured to provide an operator with information necessary for obtaining detection levels with respect to respective positions of the object in the detection area by referring to outputs from the detection level indication unit, is further provided.

The "information providing unit" may be a display plate disposed in the outer surface of a cover or a housing of the active object detection sensor. Alternatively, the "information providing unit" may be a portion of an instruction manual for the active object detection sensor.

In this configuration, the information providing unit is configured to provide the operator with information necessary for recognizing detection levels with respect to respective positions of the object in the detection area from outputs of the detecting level indication unit. Therefore, the operator who is typically the installation worker, can use the information to recognize the detection levels with respect to respective positions of an object in the detection area. Thus, the operator is allowed to identify an optimum position of the guide mark in the detection area.

Preferably, the information includes suggestion of an action to be taken. The action is to move a person's hand across the detection area. In this configuration, the operator is allowed to recognize the detection levels with respect to respective positions of the person's hand in the detection area, by taking the suggested action. In a case where the active object detection sensor is an automatic door sensor, detection of a person's hand in the detection area is the same situation as in the operation, which is a trigger for opening the automatic door during operation. As a result, the operator is allowed to adjust the detection area in almost the same conditions as in the operation, unlike in adjustment with the use of a jig such as a reflector plate.

According to another preferred embodiment, a detection area shifting mechanism configured to shift the detection area, is further provided.

In this configuration, since the detection area can be shifted by the detection area shifting mechanism, the operator is allowed to recognize the detection levels in various detection areas.

According to still another preferred embodiment, a detection level range determination unit configured to determine a level range, among a plurality of level ranges, into which the detection level of the detection beam received by the receiver falls, is further provided, and the detection level indication unit indicates the detection level by using an index associated with the level range having been determined.

An automatic door sensor device according to one aspect of the present invention includes the active object detection sensor. According to a preferred embodiment, the automatic door sensor device includes a plurality of the active object detection sensors, and the detection level indication unit is shared by or associated with the plurality of the active object detection sensors.

A method for adjusting the detection area according to still another aspect of the present invention is directed to a method for adjusting the detection area for the active object detection sensor, and the method includes:

(i) setting the action mode to the adjustment mode with the action mode setting unit;

(ii) indicating the detection level of the detection beam received by the receiver while the action mode is the adjustment mode; and (iii) moving an object about the detection area, and (ii) and (iii) are simultaneously performed.

According to a preferred embodiment, (iv) shifting the detection area after (ii) and (iii), is further provided, and (ii) and (iii), and the subsequent (iv) are repeatedly performed a plurality of times.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an active object detection sensor according to a first embodiment of the present invention will be described with reference to the drawings.

Figure 1B:
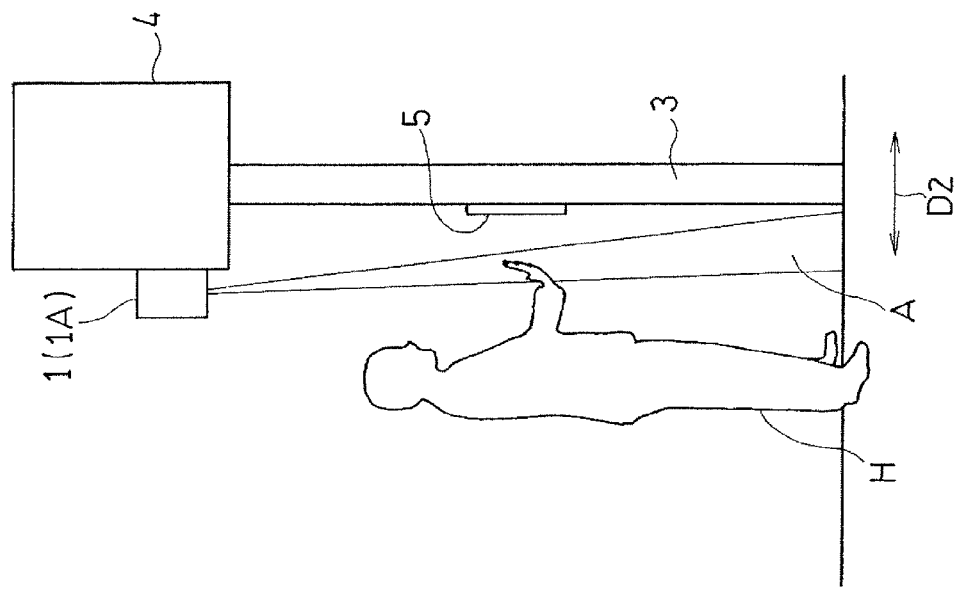
FIG. 1B is a side view of the automatic door sensor device and the detection area shown in FIG. 1A.
Figure 1A:
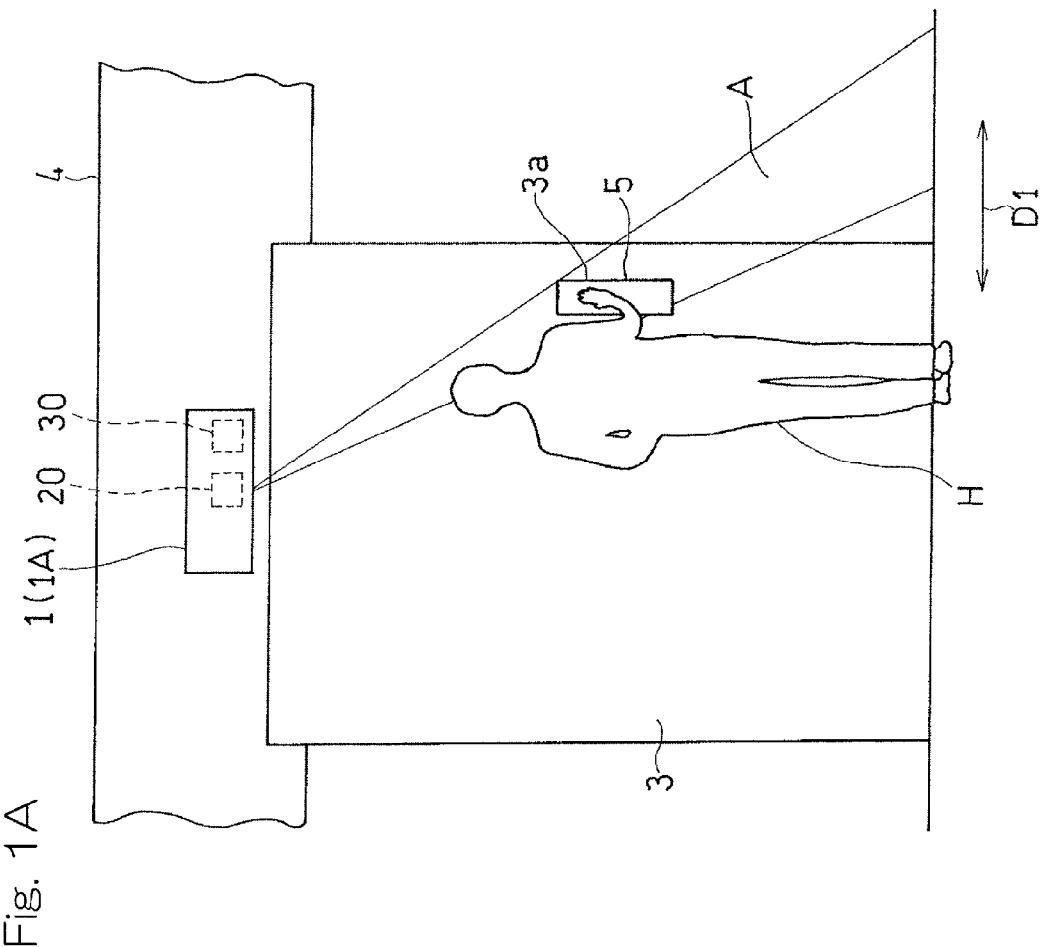
FIG. 1A is a front view of an automatic door sensor device including an active object detection sensor, and a detection area according to a first embodiment and a second embodiment of the present invention.

FIG. 1A and FIG. 1B illustrate: an automatic door sensor device 1 that includes an active object detection sensor 20 of the present embodiment; and an activation detection area (touch detection area) A thereof. The automatic door sensor device 1 is of a non-contact switch type. In response to an object approaching a guide mark 5 attached to a predetermined portion 3a of an automatic door (an automatic opening/closing unit) 3, the automatic door 3 opens, as described below.

The automatic door sensor device 1 is mounted on an outer side surface of a transom (supporting member) 4 that supports an upper end portion of the automatic door 3 that is, for example, of a sliding type. Alternatively, the automatic door sensor device 1 may be mounted on a lower side surface of the transom 4, inside the transom 4, at a ceiling, or the like. The automatic door sensor device 1 is connected to a controller (not shown) of a door engine (not shown) which is accommodated in the transom 4. The automatic door sensor device 1 of the same type or a similar automatic door sensor device may be mounted on an inner side surface of the transom 4, which is not illustrated.

Figure 2:
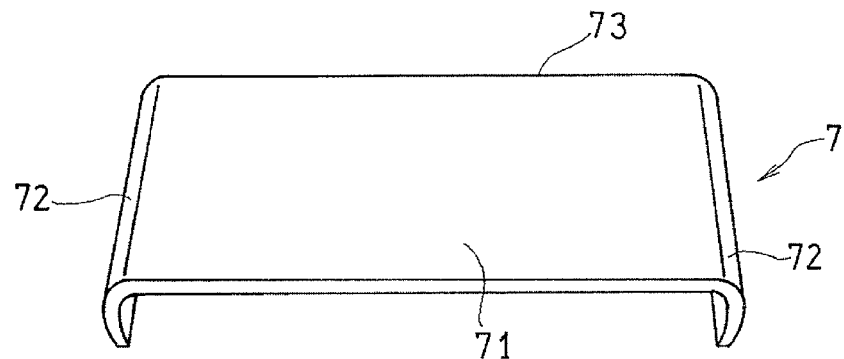
FIG. 2 is an exploded perspective view of the automatic door sensor device shown in FIG. 1A and FIG. 1B as viewed from diagonally below the automatic door sensor device, and (a), (b) and (c) illustrate a cover trim, an inner cover and a body, respectively, and a portion of the body in (c) is covered by the inner cover.
Figure 2:
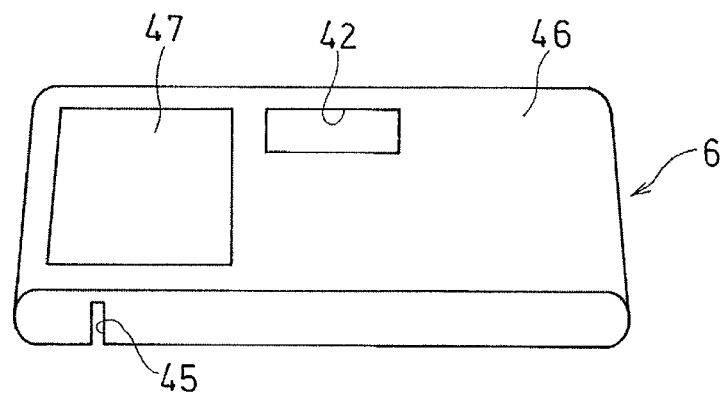
Figure 2:
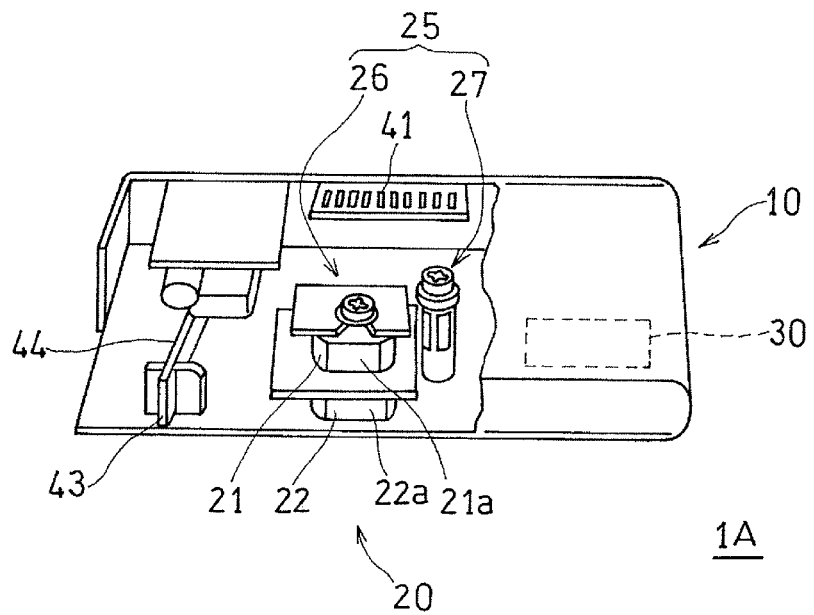

As shown in FIG. 2(a) to (c), the automatic door sensor device 1 has a body 10, an inner cover 6, and a cover trim 7. The body 10 is equipped with various components described below. The inner cover 6 made of a resin is mounted and fixed to the body 10 so as to cover the front side and the lower side of the body 10. The cover trim 7 made of a resin includes a front wall 71, side walls 72, 72, and an upper wall 73. The cover trim 7 is open on the lower side and the rear side.

In the automatic door sensor device 1, the body 10 includes an action mode setting unit 41 that enables an action mode to be set to one of an adjustment mode and an operation mode. The action mode setting unit 41 is implemented as a DIP switch. The action mode is switched through an opening 42 of the inner cover 6.

The body 10 includes an activation sensor 20 that is the active object detection sensor, of an AIR type (active infrared type), which defines or forms an activation detection area A (FIG. 1A, FIG. 1B), and an open-state maintaining sensor 30, of an AIR type (active infrared type), which defines or forms an open-state maintaining detection area (not shown).

Returning to FIG. 1A and FIG. 1B, the activation detection area A is defined so as to immediately surround the door 3 by the activation sensor 20. The action mode can be set to the operation mode through the action mode setting unit 41 (FIG. 2(c)), so that the automatic door sensor device 1 is set to be in operation. During operation of the automatic door sensor device 1, a person H can extend his/her hand that is a part of a human body, and move the hand close to the guide mark 5, according to the guide mark 5 that is attached to the door 3. The guide mark indicates, for example, "Please touch with hand". When the hand enters the activation detection area A, the hand is detected by the activation sensor 20. The activation detection area A has such a size as to prevent a person who happens to be near the automatic door 3 but has no intention to pass through the automatic door 3 from being erroneously recognized. Therefore, the activation detection area A is limited so as to have a size that is relatively reduced as compared to the open-state maintaining detection area (not shown). Thus, since the activation detection area A is small, it is very important to appropriately adjust a relative position between the activation detection area A and the guide mark 5 before the automatic door sensor device 1 is operated. The adjustment will be described below.

The activation sensor 20 shown in FIG. 2(c) has a first phototransmitter (projector) 21 provided on the front side in the front-back direction, and a first photodetector (receiver) 22 provided on the back side in the front-back direction. The first phototransmitter 21 emits near infrared rays as one kind of detection rays for object detection, toward the activation detection area A (FIG. 1A, FIG. 1B). The first phototransmitter 21 includes, for example, two light emitting (transmitting) elements (not shown) that are formed of infrared emitting diodes for transmitting near infrared rays as detection rays, and a lens body 21a disposed in front of the light emitting elements. The first photodetector 22 receives detection rays reflected by an object to generate a reception signal. The first photodetector 22 includes, for example, two light receiving (receiver) elements (not shown) that are formed of photodiodes for receiving near infrared rays as detection rays, and a lens body 22a disposed in front of the light receiving elements.

Figure 3:
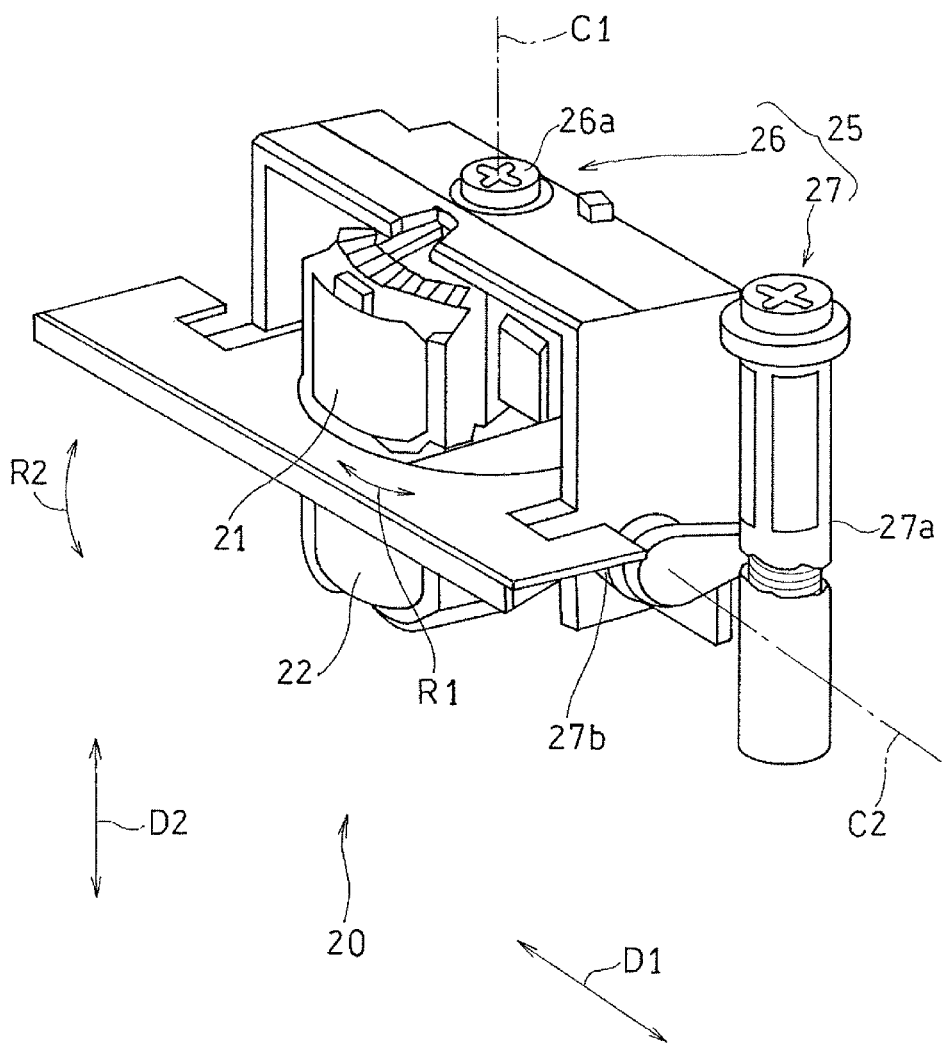
FIG. 3 is a perspective view of a detection area shifting mechanism for the automatic door sensor device shown in FIG. 1A and FIG. 1B.

The activation sensor 20 further includes an activation detection area shifting mechanism 25 as shown in FIG. 3 in an enlarged manner. The activation detection area shifting mechanism 25 includes a lateral direction adjustment mechanism 26 and a front-rear direction adjustment mechanism 27. The lateral direction adjustment mechanism 26 has a first shaft 26a that is rotated by means of a tool such as a screwdriver (not shown). The first shaft 26a extends in the front-rear direction of the automatic door sensor device 1 (FIG. 2(c)). Rotation of the first shaft 26a causes the first phototransmitter 21 and the first photodetector 22 to integrally rotate about an axis C1 of the first shaft 26a in a direction R1 in the plane parallel to the door. Therefore, the activation detection area A shown in FIG. 1A shifts in a lateral direction D1 according to the rotation of the first shaft 26a. The front-rear direction adjustment mechanism 27 shown in FIG. 3 also has a second shaft 27a that is rotated by means of a tool such as a screwdriver (not shown). The second shaft 27a also extends in the front-rear direction of the automatic door sensor device 1 (FIG. 2(c)), similarly to the first shaft 26a. To the second shaft 27a, a third shaft 27b that extends in the lateral direction of the automatic door sensor device 1 (FIG. 2(c)) is connected so as to be orthogonal to the shaft 27a. Rotation of the second shaft 27a causes the first phototransmitter 21 and the first photodetector 22 to integrally rotate about an axis C2 of the third shaft 27b in a direction R2 in the vertical plane. Therefore, the activation detection area A shown in FIG. 1B shifts in a front-rear direction D2 according to rotations of the second and the third shafts 27a and 27b.

Figure 4:
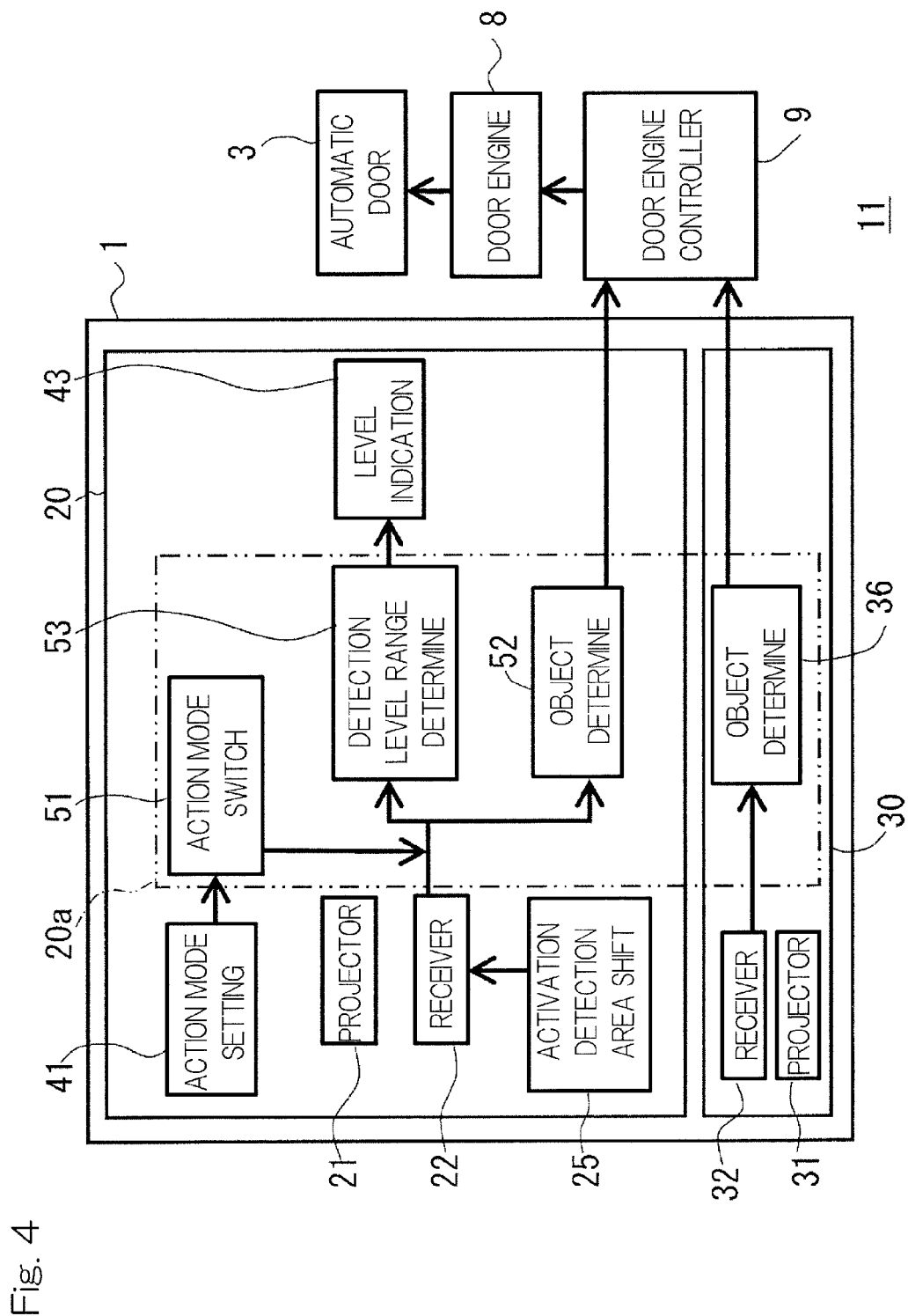
FIG. 4 is a block diagram illustrating the automatic door sensor device, shown in FIG. 1A and FIG. 1B, including the active object detection sensor according to the first embodiment of the present invention.

As shown in FIG. 4, an automatic door system 11 having the automatic door sensor device 1 includes a door engine 8 that causes the automatic door 3 to open/close, and a door engine controller 9 that causes the door engine 8 to perform an opening operation when a door opening signal is received.

The activation sensor 20 of the automatic door sensor device 1 includes a processing section 20a. The processing section 20a is implemented in a processor, such as a microcomputer, for executing programs. The processing section 20a includes an action mode switch unit 51, a first object determination unit 52, and a detection level range determination unit 53. The processing section 20a is preferably implemented by software as described here. The processing section 20a is not limited thereto, and may be implemented by hardware.

The action mode having been set through the action mode setting unit 41 is inputted to the action mode switch unit 51. The action mode switch unit 51 causes a signal concerning a received light amount of near infrared rays received by the first photodetector 22 to be inputted to one of the first object determination unit 52 and the detection level range determination unit 53 according to the inputted action mode. In particular, the action mode switch unit 51 operates to input the signal concerning the received light amount to the first object determination unit 52 while the action mode is in the operation mode, and input the signal concerning the received light amount to the detection level range determination unit 53 while the action mode is in the adjustment mode.

When the first object determination unit 52 receives the signal concerning the received light amount, the first object determination unit 52 compares a value of the signal with a predetermined operation threshold to determine that an object is in the activation detection area A (FIG. 1A, FIG. 1B) in a case where the signal concerning the received light amount indicates a value that exceeds the operation threshold. When the object determination unit 52 determines that the object is present, the object determination unit 52 outputs an object detection signal to the door engine controller 9, and then the controller 9 controls the door engine 8 such that the door engine 8 causes the automatic door 3 to open. Thus, as described above, when a hand enters the activation detection area A (FIG. 1A, FIG. 1B), the automatic door 3 opens.

The open-state maintaining sensor 30 has a second phototransmitter (projector) 31 and a second photodetector (receiver) 32. While the second phototransmitter 31 and the second photodetector 32 have the same structures as the first phototransmitter 21 and the first photodetector 22, respectively, of the activation sensor 20 described above, the open-state maintaining detection area (not shown) defined by the open-state maintaining sensor 30 has a range wider than the activation detection area A shown in FIG. 1A. The open-state maintaining sensor 30 further has a second object determination unit 36. The second object determination unit 36 is included in the processing section 20a as described above and illustrated. The processing section 20a is used by both the activation sensor 20 and the open-state maintaining sensor 30. Alternatively, the sensors 20 and 30 may individually have processing sections, respectively. The open-state maintaining sensor 30 outputs an object detection signal when the open-state maintaining sensor 30 detects an object in the open-state maintaining detection area (not shown) before the door 3 that has been opened according to detection by the activation sensor 20 is completely closed. The determination in the object detection and the output of the object detection signal are performed by the second object determination unit 36. Due to the operation of the open-state maintaining sensor 30, a person following a person who is walking ahead need not move his/her hand close to the automatic door 3 to perform an operation for opening the automatic door 3. Thus, opening/closing of the automatic door 3 is smoothly performed to allow plural persons to smoothly enter or exit.

The automatic door sensor device 1 further includes a detection level indication unit 43 that outputs a signal representing an index according to a detection level (received light amount) of detection rays received by the photodetector 22 when the action mode is in the adjustment mode. In the present embodiment, as shown in FIG. 2(c), the detection level indication unit 43 may implemented as an LED. The LED 43 is connected to a light guiding portion 44, and faces downward in a state where the automatic door sensor device 1 is installed. The inner cover 6 has a window 45 disposed so as to correspond to a position of a body of the LED 43. Therefore, light emission by the LED 43 is viewed from the outside of the automatic door sensor device 1 through the window 45.

Preferably, the LED 43 blinks when an object is detected in the activation detection area A (FIG. 1A, FIG. 1B) in a case where the action mode is in the operation mode. The cyclic period for the blinking is constant. On the other hand, in a case where the action mode is in the adjustment mode, the cyclic period for the blinking varies so as to indicate the index according to the detection level. In particular, the cyclic period is defined for each of plural detection level ranges. The detection level range determination unit 53 shown in FIG. 4 determines a level range, among the plural detection level ranges, into which the detection level of the detection rays received by the photodetector 22 falls.

For example, the detection level ranges are classified and defined according to five levels which are $L_0, L_1, L_2, L_3,$ and $L_4$. The level $L_0$ represents a reference level, corresponding to a level of detection rays received in a state where an object for the operation is not in the activation detection area A (FIG. 1A, FIG. 1B). In a case where the detection level does not vary for a predetermined period while the action mode is in the adjustment mode, the reference level $L_0$ is updated so as to represent the detection level that does not vary for the predetermined period. The other levels $L_1$ to $L_4$ are calibrated with respect to the reference level $L_0$ having been updated. While the detection level represents the reference level $L_0$, the LED 43 may switch between yellow light and green light in a cycle of 1000 ms to alternately emit the yellow light and the green light, for example. The LED 43 may blink yellow light in a cycle of 1000 ms in a case where the detection level is greater than $L_0$, and less than or equal to $L_1$, in a cycle of 500 ms in a case where the detection level is greater than $L_1$, and less than or equal to $L_2$, in a cycle of 250 ms in a case where the detection level is greater than $L_2$, and less than or equal to $L_3$, and in a cycle of 125 ms in a case where the detection level is greater than $L_3$, and less than or equal to $L_4$.

The installation worker is allowed to easily recognize the detection level of the detection rays received by the photodetector 22, based on the cyclic period for the blinking of the LED 43 shown in FIG. 2(c). Instead of or in addition to the cyclic period for the blinking of the LED, the LED may emit light with a color corresponding to the detection level. Instead of or in addition to the LED, a sound based on the detection level, for example, a sound having a pitch corresponding to the detection level may be outputted. The detection level indication unit 43 may be implemented as any means which allows the installation worker to substantially recognize the detection level. The detection level indication unit 43 is preferably formed simply by elements required for operation of the automatic door sensor device. That is, it is preferable that a device or components which are necessary only for adjustment of the activation detection area A (FIG. 1A, FIG. 1B) is not provided.

Since the installation worker is allowed to recognize the detection level (received light amount) detected by the activation sensor 20, the installation worker may determine sensitivity of the activation sensor 20.

In a case where the action mode is in the adjustment mode, even when an object is in the activation detection area A (FIG. 1A, FIG. 1B), door opening signal output means (not shown) does not output the door opening signal. Thus, in the adjustment mode, the door 3 is kept open or closed, unlike in the operation mode.

Figure 5:
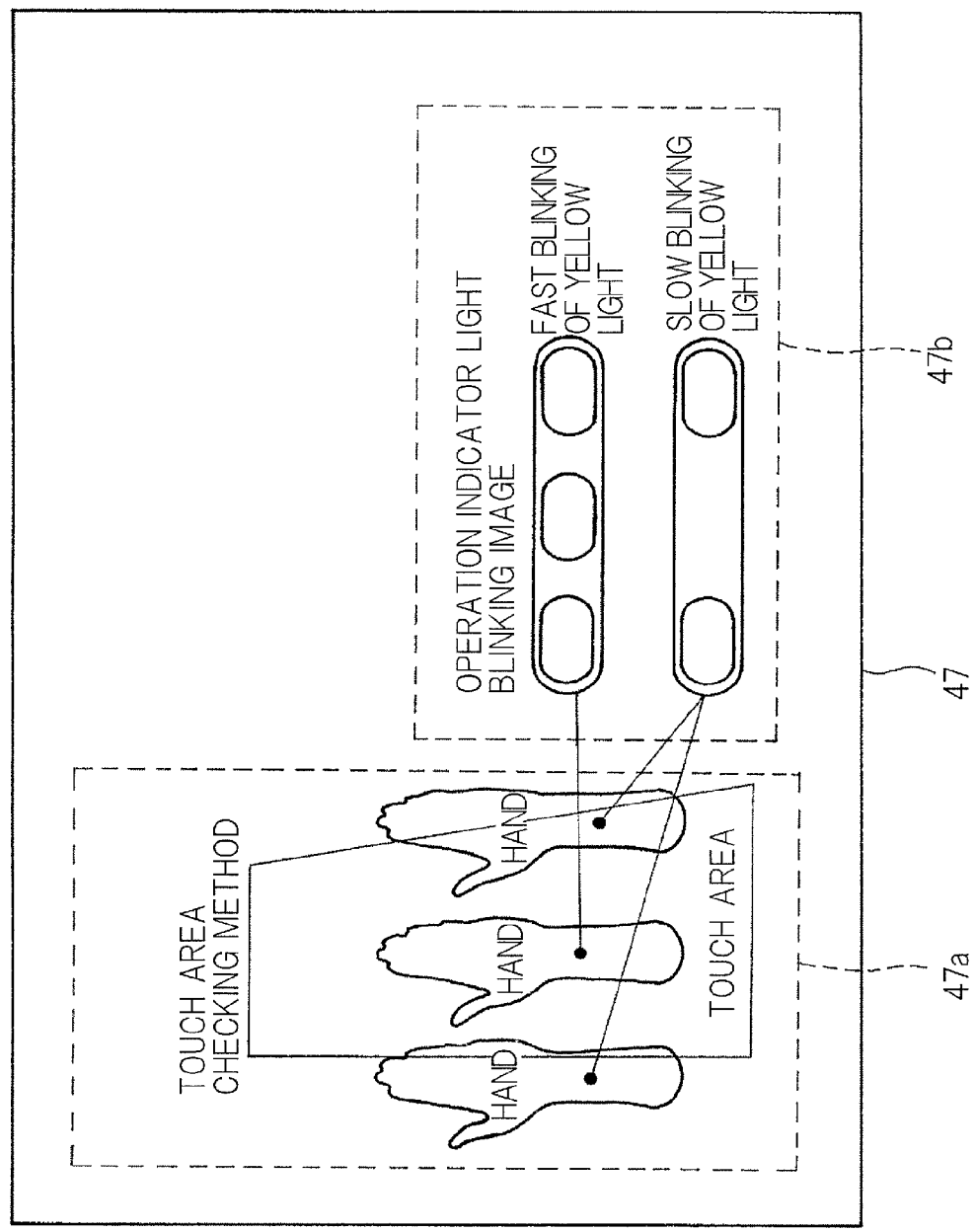
FIG. 5 is a top view of a display plate (an information providing unit) disposed in the automatic door sensor device shown in FIG. 1A and FIG. 1B.

The automatic door sensor device 1 further includes a display plate as an information providing unit 47 in a front surface 46 of the inner cover 6 as shown in FIG. 2(b). The display plate 47 is used to provide an operator (installation worker) with information necessary for the operator to recognize, from the cyclic period for blinking of the LED 43, the detection level for a position of an object in the activation detection area A (FIG. 1A, FIG. 1B). For example, as illustrated in FIG. 5, the display plate 47 includes an action suggestion section 47a that suggests an action to be taken, and an index explanation section 47b for explaining indexes based on the detection levels. While the installation including the adjustment of the activation detection area A (FIG. 1A, FIG. 1B) is performed, the cover trim 7 (FIG. 2(a)) is not mounted to the automatic door sensor device 1 (FIG. 2(c)), and the inner cover 6 (FIG. 2(b)) is simply mounted to the body 10 (FIG. 2(c)). Therefore, the display plate 47 can be very easily viewed by the installation worker who handles the automatic door sensor device 1 (FIG. 2(c)).

The action suggestion section 47a indicates an explanatory description such as "touch area checking method", and a figure showing a portion or the entirety of a hand of a person is laid over a touch area (activation detection area). This suggests that the installation worker take an action for moving a person's hand across the activation detection area A along the lateral direction D1 (FIG. 1A), and/or an action for moving the person's hand across the activation detection area A along the front-rear direction D2 (FIG. 1B).

The index explanation section 47b indicates an explanatory description such as "operation indicator light blinking image", and, further, characters representing "slow blinking of yellow light" and characters representing "fast blinking of yellow light" are associated with respective portions representing states in which a portion or the entirety of a person's hand is laid over the touch area (activation detection area) in the action suggestion section 47a. The characters representing "slow blinking of yellow light" and the characters representing "fast blinking of yellow light" indicate that the slower the blinking is (the longer the cyclic period for the blinking is), the lower the detection level is, and the faster the blinking is (the shorter the cyclic period for the blinking is), the higher the detection level is.

The installation worker who moves his/her hand across the activation detection area A so as to take the action suggested by the action suggestion section 47a, observes the cyclic period for the blinking of the LED 43 (FIG. 2(c)) to recognize the detection level based on the position of the hand in the activation detection area A (FIG. 1A, FIG. 1B) with referring to the explanation of the index explanation section 47b.

Next, a method for adjusting the detection area for the active object detection sensor (activation sensor) will be described.

As shown in FIG. 1A and FIG. 1B, the installation worker adjusts a relative position between the activation detection area A and the guide mark 5 so as to optimize the relative position before operation of the automatic door sensor device 1. For this adjustment, the action mode setting unit 41 (FIG. 3(c)) is manipulated to set the action mode to the adjustment mode. When the automatic door sensor device 1 is activated, the activation detection sensor 20 identifies the reference detection level $L_0$. That is, if a detection level does not vary for a predetermined period, the detection level is determined as the reference level.

Hereinafter, a case (case 1) where a position at which the guide mark 5 is mounted to the automatic door 3 is limited due to, for example, a structure of the automatic door 3, and a case (case 2) where a position at which the guide mark 5 is mounted thereto is not limited, will be described.

<Case 1>

It is assumed that a position at which the guide mark 5 is to be mounted is limited and previously determined. Accordingly, the guide mark 5 is previously attached to the automatic door 3 or at a position near the automatic door 3. The automatic door sensor device 1 is installed, and thereafter the activation detection area A is adjusted. Initially, the installation worker suitably adjusts orientations of the first phototransmitter (projector) 21 and the first photodetector (receiver) 22 of the activation sensor 20 shown in FIG. 2(c) by using the activation detection area shifting mechanism 25. It is assumed that, in this adjustment, the activation detection area A is set as shown in FIG. 6(a). Next, the installation worker moves his/her hand HH sequentially through positions P1, P2, P3, P4, and P5 in the lateral direction D1 according to the suggestion by the action suggestion section 47a (FIG. 5) of the display plate 47 (FIG. 5) positioned in the front surface of the automatic door sensor device 1 which has not been covered by the cover trim 7 (FIG. 2(a)). Thus, the installation worker can check whether or not the activation detection area A that cannot be visualized, is set in an appropriate position relative to the guide mark 5.

The detection level detected by the activation detection sensor 20 represents the reference level $L_0$ as shown in FIG. 6(b) when the hand is not in the activation detection area A at the position P1. At this time, the LED 43 switches between yellow light and green light in a cycle of 1000 ms to alternately emit the yellow light and the green light, thereby indicating that the detection level represents the reference level $L_0$. Thereafter, the hand HH enters the activation detection area A at the position P2, and the detection level detected by the activation detection sensor 20 is enhanced to exceed $L_0$. At this time, yellow light from the LED 43 blinks in a cycle of 1000 ms. The cyclic period for blinking of the yellow light from the LED 43 is shortened stepwise according to the movement of the hand HH. The detection level exceeds $L_4$ at the position P3, and the yellow light blinks in a cycle of 125 ms. The detection level detected by the activation detection sensor 20 is then reduced, and becomes less than or equal to $L_1$ at the position P4. At the position P5, the hand is outside the activation detection area A, whereby the detection level is returned to the reference level $L_0$.

Thus, the installation worker moves his/her hand in the lateral direction D1, whereby the detection level L detected by the activation detection sensor 20 varies, and the installation worker is allowed to recognize the detection level L based on the cyclic period for blinking of the LED 43. The installation worker also moves his/her hand in the front-rear direction D2 (FIG. 1B), whereby the installation worker is allowed to similarly recognize that the detection level L detected by the activation detection sensor 20 varies.

Figure 6:
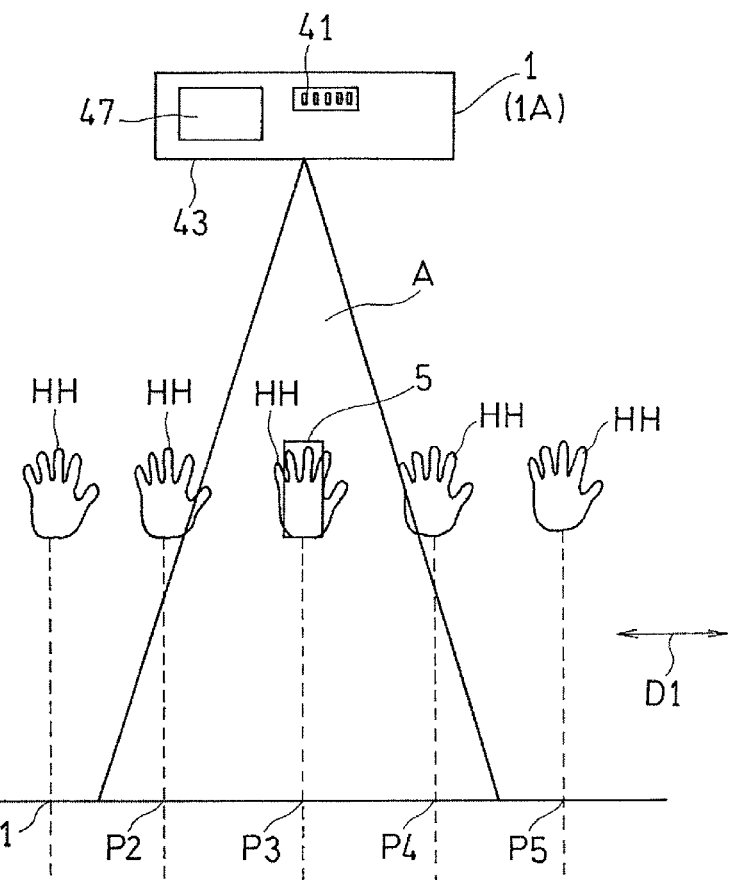
FIG. 6 illustrates a method for adjusting a detection area for the automatic door sensor device shown in FIG. 1A and FIG. 1B, (a) is a front view illustrating the automatic door sensor device and positions of a hand moved by an operator in a lateral direction relative to the detection area, and (b) shows a graph representing a detection level for each position of the hand shown in (a)
Figure 6:
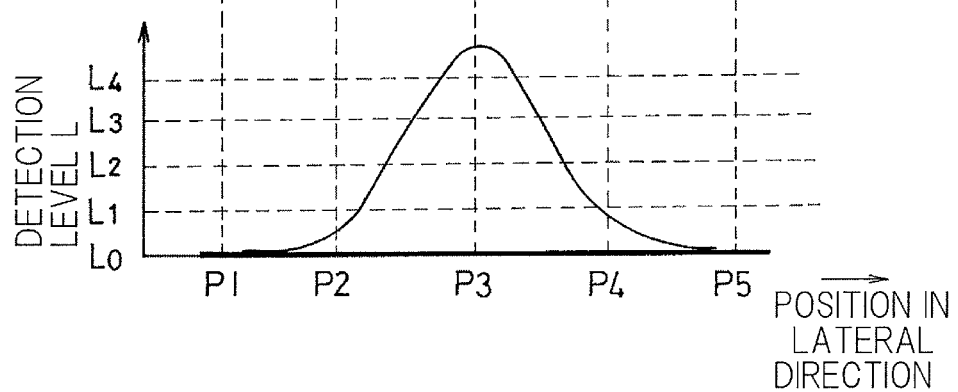

According to these results, the installation worker is allowed to check whether or not a peak of the detection level L and the guide mark 5 deviate from each other. The first phototransmitter 21 and the first photodetector 22 are rotated in the direction R1 and/or the direction R2 through the lateral direction adjustment mechanism 26 and the front-rear direction adjustment mechanism 27, respectively, as shown in FIG. 3, such that the peak of the detection level L and the guide mark 5 meet each other. In particular, in a case where the peak of the detection level L as shown in FIG. 6(*b*) appears to the left of the guide mark 5 shown in FIG. 6(*a*) on the sheet surface, the lateral direction adjustment mechanism 26 shown in FIG. 3 is rotated in the direction R1 such that the first phototransmitter 21 and the first photodetector 22 are away from the front, to shift the activation detection area A shown in FIG. 6(*a*) rightward on the sheet surface. The similar adjustment is performed for the activation detection area A in the front-rear direction.

The shift of the activation detection area A causes change of the reference detection level. In order to address this, if a detection level does not vary for a predetermined period, the activation sensor 20 updates the reference detection level $L_0$ so as to represent the detection level that does not vary for the predetermined period. Thus, the detection level obtained when a moving object does not exist in the shifted activation detection area A becomes the reference detection level $L_0$.

The activation detection area A is thus shifted, and the installation worker then repeats the same process steps. That is, the installation worker observes a cyclic period for blinking of the LED 43 while moving his/her hand in the lateral direction, and then observes a cyclic period for blinking of the LED 43 while moving his/her hand in the front-rear direction. Based on the results thereof, the installation worker rotates the first phototransmitter 21 and the first photodetector 22 to adjust the activation detection area A. The installation worker repeats these process steps, whereby the activation detection area A is adjusted so as to be at an appropriate position relative to the fixed guide mark 5. The installation worker may adjust the activation detection area A only in the lateral direction without adjusting the activation detection area A in the front-rear direction.

<Case 2>

It is assumed that a position at which the guide mark 5 is to be mounted is not limited. Also in this case, the installation worker moves his/her hand to recognize deviation between the guide mark 5 and the activation detection area A as described for case 1. Case 2 is different from case 1 in that, in case 2, the installation worker may change the position of the guide mark 5 instead of or in addition to adjustment of the activation detection area A by rotating the first phototransmitter 21 and the first photodetector 22, in order to reduce the deviation between the guide mark 5 and the activation detection area A. In order to reduce the deviation between the guide mark 5 and the activation detection area A by simply changing the position of the guide mark 5, the installation worker moves his/her hand HH once, learns a position at which the peak of the blinking of the LED 43 appears during the movement of his/her hand, and simply changes the position of the guide mark 5 to that position. Thus, the deviation can be reduced. The number of times the installation worker repeatedly performs the process steps may be reduced compared to case 1.

The guide mark 5 may not be provided. In this case, the installation worker repeats the aforementioned operation such that the detection peak appears at a specific position or in a positional range including positions surrounding the specific position, thereby adjusting the activation detection area A.

By the activation detection area A of the automatic door sensor device being adjusted as described above, a relative position between the activation detection area A and the guide mark 5 is optimized. After this adjustment, the installation worker attaches the cover trim 7 (FIG. 2(*a*)) to the automatic door sensor device 1. Thereafter, the action mode is set to the operation mode, so that a person who will pass through the automatic door 3 is assuredly detected.

Figure 7:
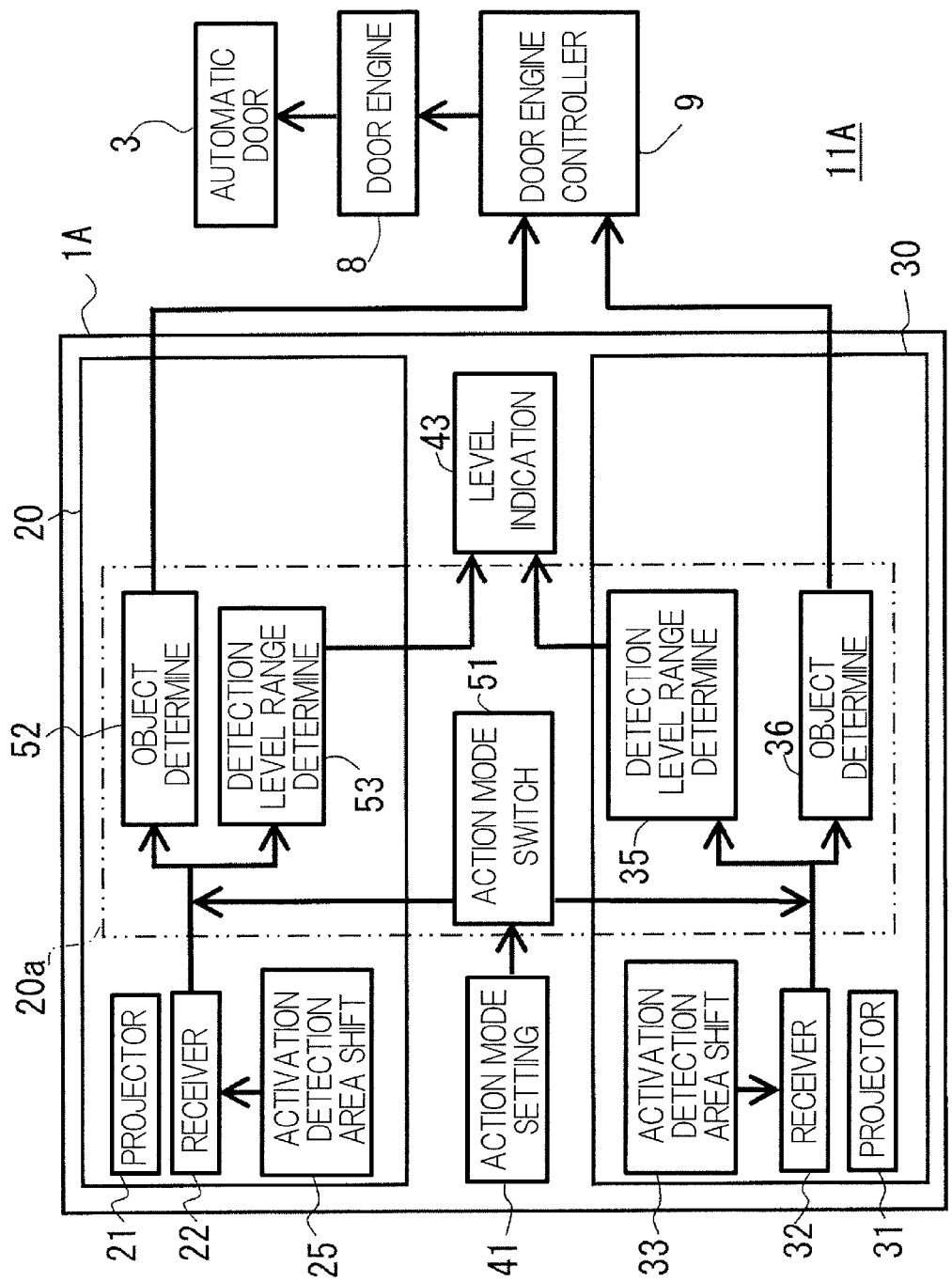
FIG. 7 is a block diagram illustrating the automatic door sensor device, shown in FIG. 1A and FIG. 1B, including the active object detection sensor according to the second embodiment of the present invention.

Hereinafter, an automatic door sensor device 1A that includes an active object detection sensor according to a second embodiment of the present invention will be described with reference to FIG. 7. In the present embodiment, components common to the components described for the first embodiment are denoted by the same reference numerals, and the description thereof is not given.

In the automatic door sensor device 1A, not only the activation sensor 20 but also the open-state maintaining sensor 30 acts as the active object detection sensor according to the present embodiment. In the automatic door sensor device 1A, the action mode setting unit 41, the action mode switch unit 51, and the detection level indication unit 43 are not provided in the activation sensor 20, and are provided so as to operate similarly for both the activation sensor 20 and the open-state maintaining sensor 30.

In the present embodiment, the open-state maintaining sensor 30 has an activation detection area shifting mechanism 33 and a detection level range determination unit 35, similarly to the activation sensor 20. Thus, the installation worker is allowed to recognize the detection level also for the open-state maintaining sensor 30.

The action mode setting unit 41 enables the action mode to be set to one of the adjustment mode and the operation mode. Further, when the action mode is set to the adjustment mode, one of the sensors 20 and 30 is required to be specified as a sensor to be adjusted through the action mode setting unit 41. If the action mode is in the operation mode, the action mode switch unit 51 operates so as to input a signal concerning an amount of light received by the photodetectors 22 and 32, to the first object determination unit 52 and the second object determination unit 36, respectively. If the action mode is in the adjustment mode for the activation sensor 20, the action mode switch unit 51 operates so as to input a signal concerning an amount of light received by the first photodetector 22, to the detection level range determination unit 53 of the activation sensor 20. If the action mode is in the adjustment mode for the open-state maintaining sensor 30, the action mode switch unit 51 operates so as to input a signal concerning an amount of light received by the second photodetector 32, to the detection level range determination unit 35 of the open-state maintaining sensor 30.

The operation of the automatic door sensor device 1A and the adjustment of the activation detection area A are the same as those for the automatic door sensor device 1 described in the first embodiment. The automatic door sensor device 1A having the aforementioned structure enables adjustment of not only the activation detection area A shown in FIG. 1A and FIG. 1B, but also the open-state maintaining detection area (not shown). The adjustment can be performed in a manner similar to that for the activation detection area A. For the open-state maintaining detection area, a specific mark, such as the guide mark 5, according to which an appropriate area position is adjusted, is not provided. However, for example, in the automatic door 3 having doors (door panels) that slide toward both sides, respectively, a portion of the automatic door 3 at which both the doors contact with each other may be regarded as the mark.

In the present embodiment, the action mode setting unit 41, the action mode switch unit 51, and the detection level indication unit 43 are shared by the sensors 20 and 30. However, these units may be provided to each of the sensors 20 and 30.

In the present embodiment, the automatic door 3 may not be of a non-contact switch type. The adjustment of the detection area may be performed only for the open-state maintaining sensor 30.

The present invention is not limited to the embodiments described above, and various additions, modifications, or deletions may be made without departing from the gist of the invention.

For example, the action mode setting unit 41 may not be provided. The action mode may become one of the adjustment mode and the operation mode in accordance with a state in which the automatic door sensor device is being actually used. In other words, in the state in which the detection area is being adjusted, the action mode is being in the adjustment mode, and in the state in which the automatic door 3 is controlled according to detection of an object, the action mode is being in the operation mode. Therefore, for example, the detection level range determination unit 53 and the detection level indication unit 43 shown in FIG. 4 may continue to perform processes regardless of the action mode.

The action mode setting unit 41 is implemented as a DIP switch in the above description. The action mode setting unit 41 may be implemented as any means that set the action mode to one of the adjustment mode and the operation mode triggered by a certain event. The action mode setting unit 41 preferably sets the action mode to one of the adjustment mode and the operation mode in response to an action by an operator. However, the action mode setting unit 41 may not operate in response to an action by an operator, and may set the action mode triggered by an event such as reception of a signal.

The information providing unit 47 is not limited to the display plate disposed in the outer surface of the cover of the automatic door sensor device, and may be implemented as any means that allows information to be provided to the operator. For example, the information providing unit 47 may be implemented as a part of an instruction manual for the automatic door sensor device. The automatic door 3 is not limited to a sliding door, and may be an automatic swing door. The activation detection area A is not limited to the area in which the guide mark 5 is a reference point, and may be positioned, for example, to a portion to which a person who is passing moves his/her hand close in order to unlock the door. Therefore, these are construed as included within the scope of the present invention.

Although the present invention has been fully described in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

3: automatic opening/closing unit
20: active object detection sensor
41: action mode setting unit
21: projector
22: receiver
43: detection level indication unit
A: touch detection area
HH: object

What is claimed is:

1. An active object detection sensor used for opening/closing of an automatic opening/closing unit, the active object detection sensor comprising:
   a projector configured to project a detection beam onto a detection area;
   a receiver configured to receive the detection beam reflected by an object in the detection area;
   object determination unit configured to, while an action mode is an operation mode, determine that an object is in the detection area when a detection level of the detection beam received by the receiver exceeds an operation threshold, to output an object detection signal; and
   a detection level indication unit configured to, while the action mode is an adjustment mode, indicate the detection level of the detection beam received by the receiver.

2. The active object detection sensor as claimed in claim 1, further comprising an action mode setting unit configured to enable the action mode to be set to one of the adjustment mode and the operation mode.

3. The active object detection sensor as claimed in claim 1, wherein
   the detection area includes a touch detection area, and
   the projector projects a detection beam onto the touch detection area so as to detect an object that contacts with a predetermined portion of the automatic opening/closing unit, or an object that will contact with the predetermined portion thereof.

4. The active object detection sensor as claimed in claim 3, wherein, to the predetermined portion of the automatic opening/closing unit, a guide mark is attached.

5. The active object detection sensor as claimed in claim 1, further comprising an information providing unit configured to provide an operator with information necessary for recognizing detection levels with respect to respective positions of the object in the detection area from outputs of the detection level indication unit.

6. The active object detection sensor as claimed in claim 5, wherein the information includes suggestion of an action to be taken, and the action is to move a person's hand across the detection area.

7. The active object detection sensor as claimed in claim 1, further comprising a detection area shifting mechanism configured to shift the detection area.

8. The active object detection sensor as claimed in claim 1, further comprising a detection level range determination unit configured to determine a level range, among a plurality of level ranges, into which the detection level of the detection beam received by the receiver falls, wherein the detection level indication unit indicates the detection level by using an index associated with the level range having been determined.

9. An automatic door sensor device comprising the active object detection sensor as claimed in claim 1.

10. The automatic door sensor device as claimed in claim 9, comprising a plurality of the active object detection sensors, wherein
the detection level indication unit is shared by the plurality of the active object detection sensors.

11. A method for adjusting the detection area for the active object detection sensor as claimed in claim 1, comprising:
   (i) setting the action mode to the adjustment mode with the action mode setting unit;
   (ii) indicating the detection level of the detection beam received by the receiver while the action mode is the adjustment mode; and
   (iii) moving an object about the detection area, wherein
   (ii) and (iii) are simultaneously performed.

12. The method for adjusting the detection area as claimed in claim 11, further comprising
   (iv) shifting the detection area after (ii) and (iii), wherein
   (ii) and (iii), and the subsequent (iv) are repeatedly performed a plurality of times.

* * * * *